Figure 1:
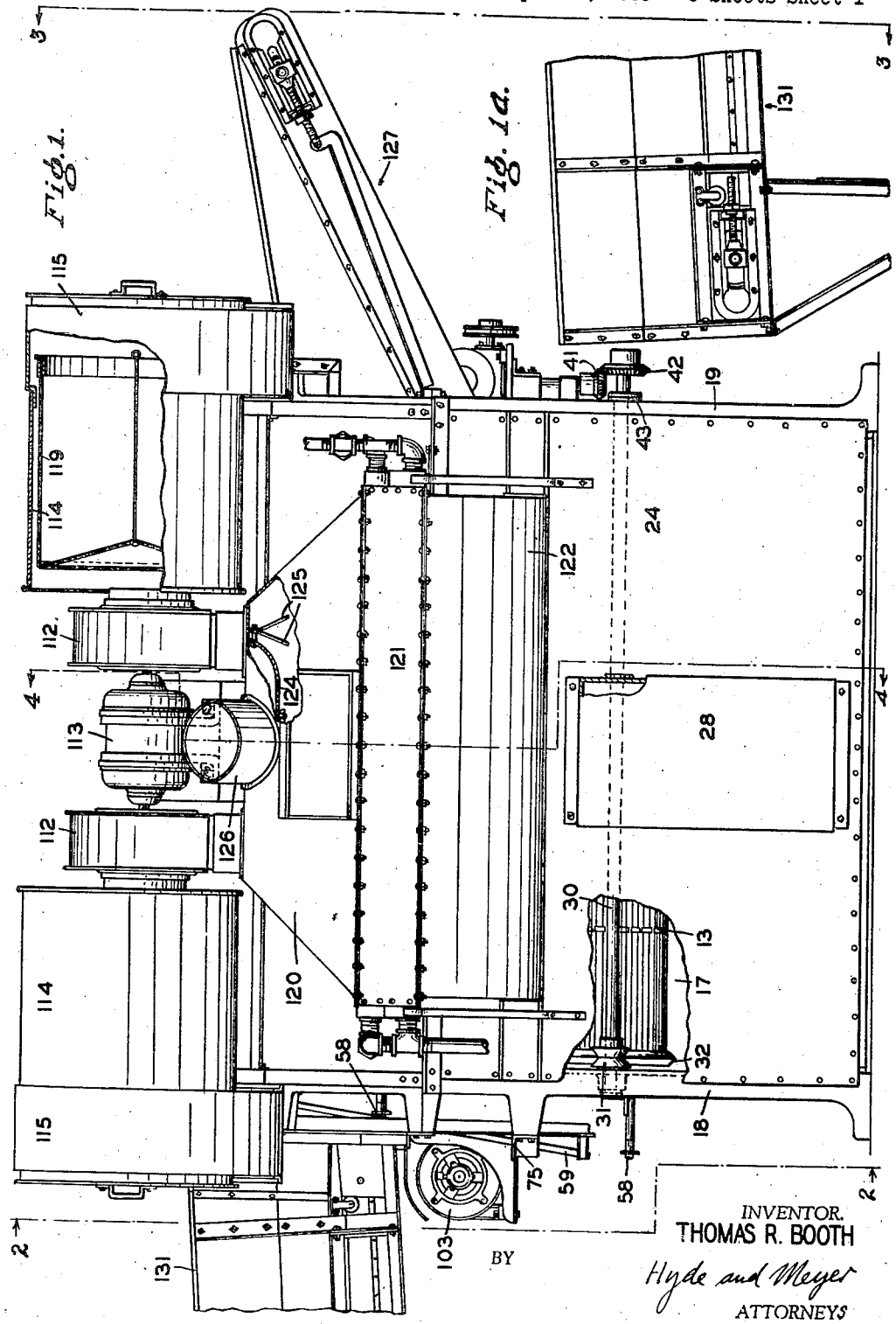

May 9, 1944.  T. R. BOOTH  2,348,597
METHOD OF CLEANING AND RENOVATING WASTE
Original Filed Sept. 30, 1939    5 Sheets-Sheet 3
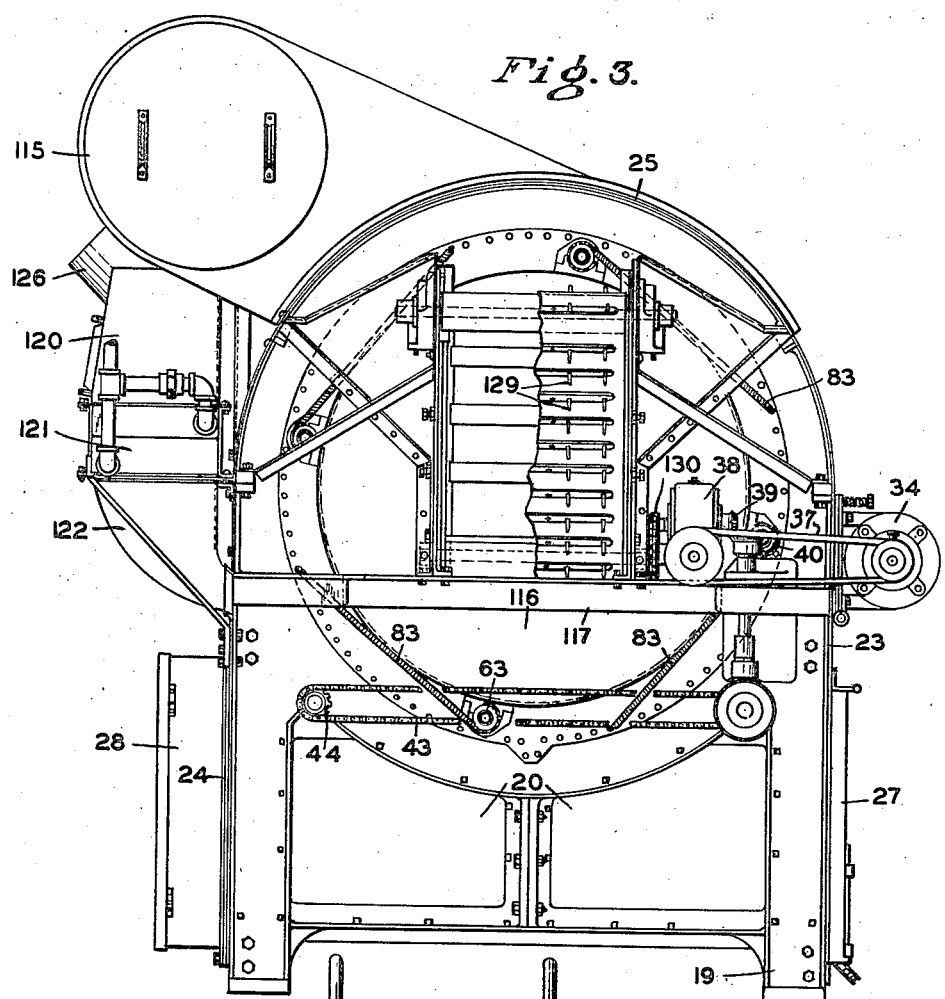
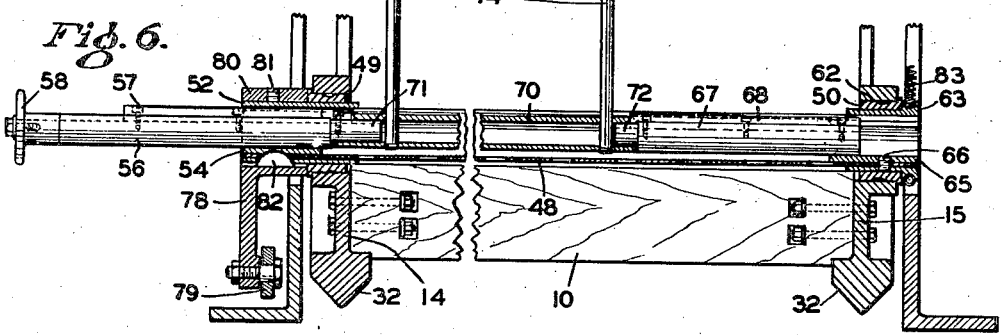
INVENTOR
THOMAS R. BOOTH
BY *Hyde and Meyer*
ATTORNEYS INVENTOR
THOMAS R. BOOTH
BY Hyde and Meyer
ATTORNEYS May 9, 1944. T. R. BOOTH 2,348,597
METHOD OF CLEANING AND RENOVATING WASTE
Original Filed Sept. 30, 1939 5 Sheets-Sheet 5

INVENTOR.
THOMAS R. BOOTH
BY Hyde and Meyer
ATTORNEYS

Patented May 9, 1944

2,348,597

UNITED STATES PATENT OFFICE 2,348,597

METHOD OF CLEANING AND RENOVATING WASTE

Thomas R. Booth, Indianapolis, Ind., assignor to Railway Service and Supply Corporation, Indianapolis, Ind., a corporation of Indiana Original application September 30, 1939, Serial No. 297,197, now Patent No. 2,267,894, dated December 30, 1941. Divided and this application May 1, 1941, Serial No. 391,262

6 Claims. (Cl. 19—66)

This invention relates to methods of cleaning and renovating journal box waste, although other fibrous materials, and materials of granular form or the like, may be cleaned and renovated by the methods here involved. The present application is a division of my copending application, Serial No. 297,197, filed September 30, 1939, now Patent No. 2,267,894, of December 30, 1941.

Journal box waste, after use thereof, not only contains objectionable foreign matter, such as dirt, cinders, moisture and the like, but also, is in such a packed and matted condition that its inherent resiliency and its ability to absorb and retain oil are materially impaired. Moreover, new journal box waste, as initially prepared, and old waste after use thereof, contain an objectionable amount of very short fibers or lint, as it is usually termed, and the removal of such lint is necessary if the waste is to satisfactorily perform its lubricating function.

One of the objects of the present invention, therefore, is the provision of a method which economically and efficiently removes from old waste its foreign content, such as dirt, cinders, moisture and the like, and which removes from both old and new wastes substantially all of the lint therein, thereby putting such waste in a clean condition, and which also renovates old waste by restoring its inherent resiliency and its ability to absorb and retain lubricating oil.

Another object of the present invention is the provision of a method which enables old and new waste, in any desired proportions, to be intimately and thoroughly mixed or intermingled, as it is now a well recognized fact that the most satisfactory journal box waste is a mixture of old and new waste, one very satisfactory mixture being formed of seventy-five per cent old waste and twenty-five per cent new waste.

Another object of the present invention is the provision of an economical and efficient method of cleaning and renovating waste and of mixing old and new waste, intimately and thoroughly, in any desired proportions while said old waste is being cleaned and renovated and while such new waste is being freed of its objectionable lint content.

Further objects of the present invention are in part obvious and in part will appear more in detail hereinafter.

Although the methods constituting the subject matter of the present application are not dependent for their practice or employment upon the use of any particular apparatus, the apparatus here illustrated (and which constitutes the subject matter of the aforesaid application, Serial No. 297,197, of which the present application is a division) affords a means for carrying out said methods with great efficiency.

Figure 2:
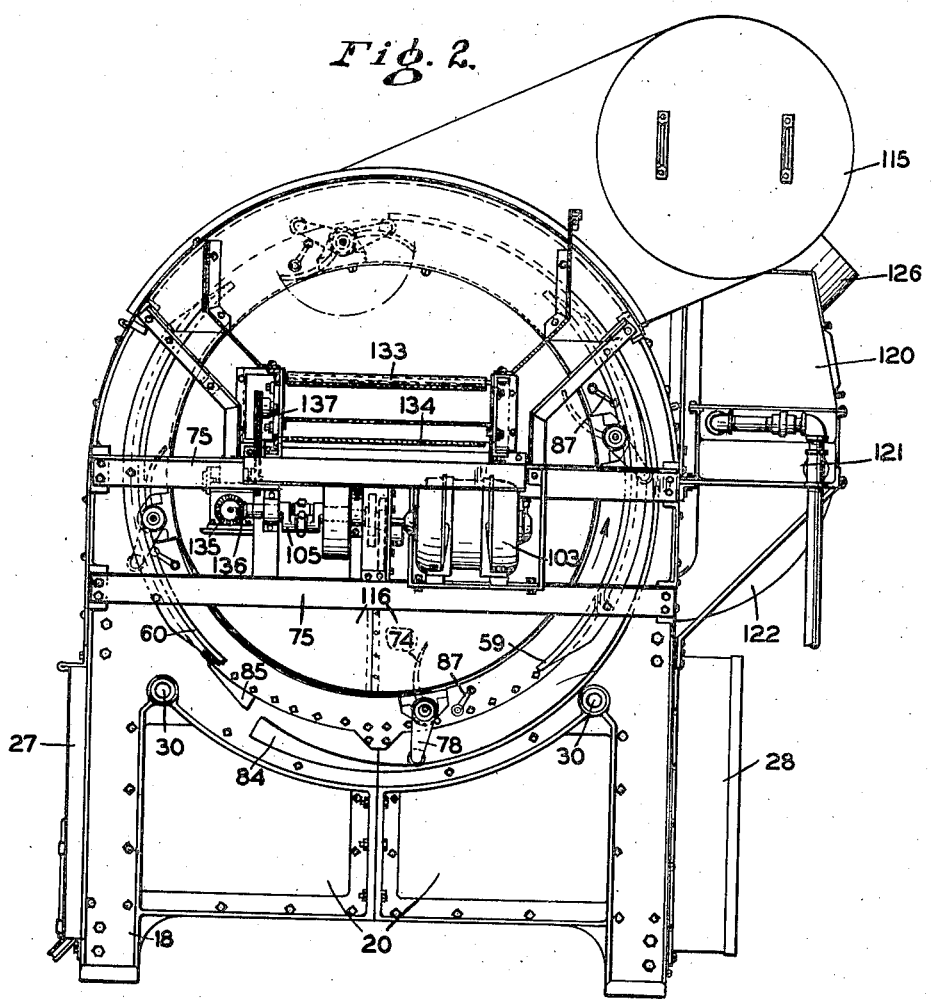
Figure 4:
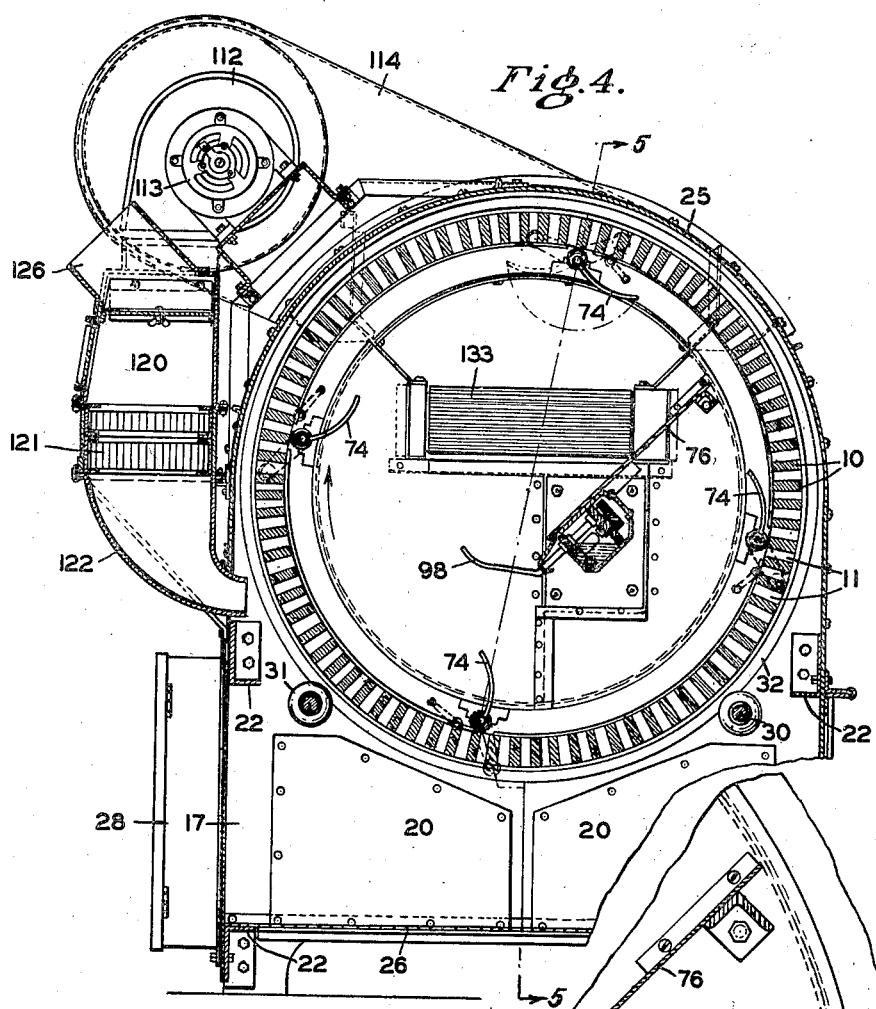
Figure 4A:
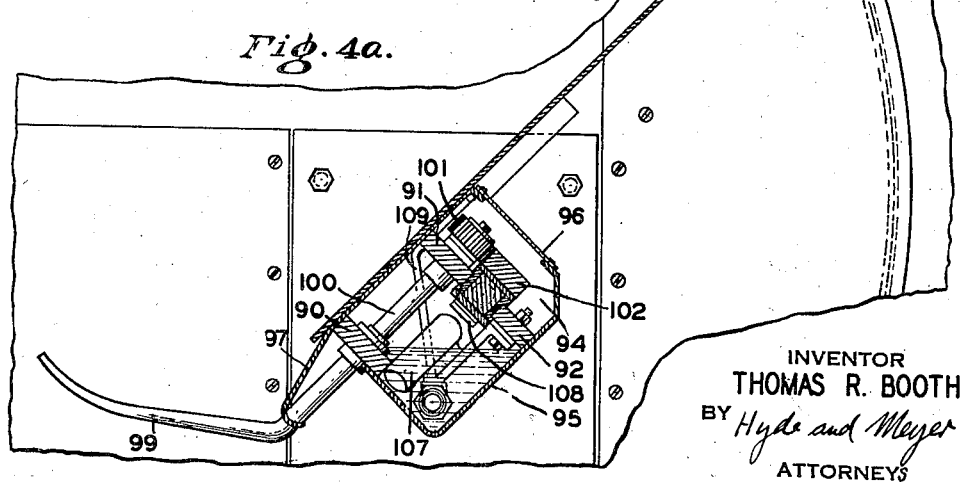
Figure 5:
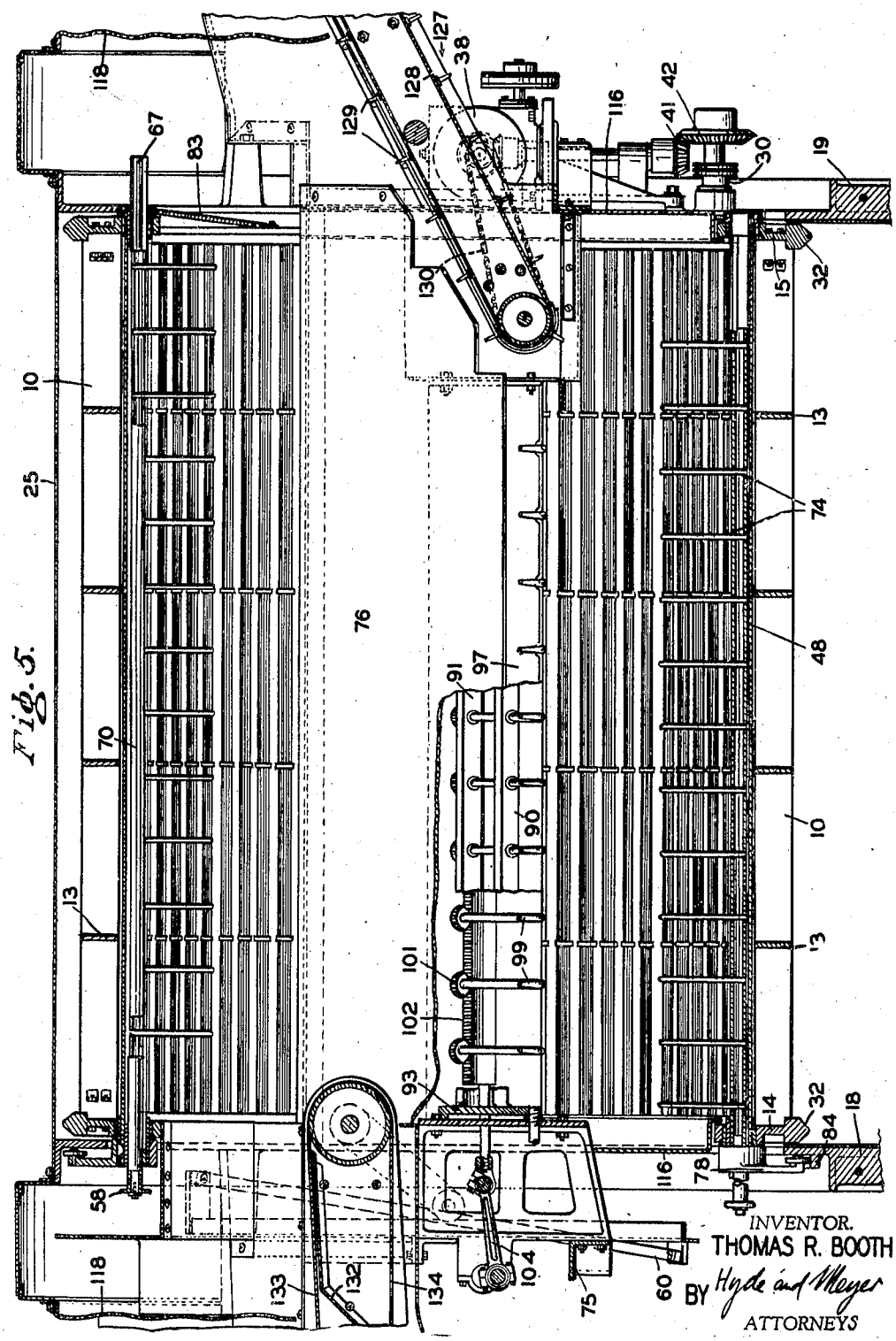

Referring now to the accompanying drawings, in which such apparatus is illustrated, Fig. 1 is a side elevation of said apparatus, a portion of the casing thereof being broken away to disclose a part of the rotatable waste-receiving cylinder therein, and said view showing the inner end portion of a waste feeding conveyor which may be used with such apparatus, if desired; Fig. 1a is a side elevation of the outer end portion of such waste feeding conveyor; Fig. 2 is a view of the inbound end of the apparatus, as viewed from the line 2—2, Fig. 1, (the line being through the waste feeding conveyor); Fig. 3 is a view of the outbound end of the apparatus, as viewed from the line 3—3, Fig. 1, a portion of the waste discharging conveyor being broken away to illustrate interior parts thereof; Fig. 4 is a detail cross-sectional view through the apparatus, on the line 4—4, Fig. 1; Fig. 4a is an enlarged view of the waste shaking mechanism, as it appears in Fig. 4; Fig. 5 is a longitudinal view through the apparatus, on the line 5—5, Fig. 4; and Fig. 6 is a detail longitudinal view, on an enlarged scale, of one of the prong bar assemblies which automatically effects the movement of the waste through the apparatus and which aid in the tumbling of the waste while in such apparatus.

Before the methods here involved are described in detail, it is to be understood that the phraseology or terminology herein employed is for the purpose of description and not of limitation, the scope of the present invention being denoted by the scope of the appended claims.

Generally speaking, the apparatus here illustrated includes (a) a rotatable cylinder of foraminous character within which the waste (or other material) is cleaned and renovated; (b) an enclosing casing for said cylinder; (c) means for automatically effecting the travel of the material through said cylinder and for aiding in the tumbling of the waste in said cylinder; (d) means for repeatedly and vigorously shaking said waste during its travel through said cylinder, with the subsequent breaking or loosening up of such waste and the removal therefrom of its foreign content, such as dirt, cinders, lint and the like; (e) means for subjecting such waste to heated air currents during its travel through said cylinder; the effect of such air currents being to dry such waste and to carry from the cylinder the moisture and the finer particles of lint removed from the waste by the shaking and tumbling thereof; and (f) conveyor means for automatically removing from the cylinder and its enclosing casing the cleaned and renovated waste. Such apparatus may also include, if desired and as here shown, conveyor means for automatically feeding to said cylinder, at any desired rate, the waste or other material to be cleaned and renovated.

As heretofore pointed out, the present invention is particularly useful in the cleaning and renovating of journal box waste, and for purposes of description only and not of limitation, the apparatus here illustrated, as used for cleaning and renovating such waste, will be described.

The rotatable cylinder of the present apparatus, a cylinder which may and here does have its longitudinal axis substantially horizontal, has an opening at one end, hereinafter termed its inbound end, for the reception of the waste to be cleaned and renovated, and an opening at its other end, hereinafter termed its outbound end, through which the cleaned and renovated waste is removed. The cylindrical side wall of such cylinder is here formed of a plurality of longitudinally extending, radially disposed and circumferentially spaced slats 10, of wood or other suitable material, and to add to the rigidity of such cylinder side wall and to longitudinally divide or break up the slots 11 between adjacent slats, one or more sets of circumferentially disposed slat partition members 13 may be utilized, if desired, there being four sets of such partition members in the cylinder here shown.

The circumferentially disposed and longitudinally separated slots 11 of the cylinder side wall determine and control, as will be readily understood, the screening effect of such cylinder side wall, and such slots are, of course, of sufficient size to permit the passage therethrough, under the influence of gravity or otherwise, of the dirt, cinders, the heavier particles of lint, etc. which are freed from the waste while it is in such cylinder. Bolted or otherwise rigidly secured to the ends of the slats 10, one at the inbound end of the cylinder and the other at the outbound end thereof, are two relatively heavy end rings 14 and 15, which may be in the form of metal castings, and by means of which the cylinder is supported and through which it is rotated.

The casing here shown for enclosing said waste-receiving cylinder, and for enclosing a compartment 17 therebelow for the foreign matter removed from the waste, includes two relatively heavy, upright end castings 18 and 19, the openings in which, at the ends of the refuse compartment 17, are closed by suitable end plates 20. For rigidly connecting said end castings in properly spaced relation and in upright condition a plurality (such as four) of relatively heavy angle bars 22 are here utilized, the end portions of which are bolted or otherwise suitably secured to such castings. Extending between such end castings and screwed or otherwise suitably secured thereto is a sheet metal cover member, which forms the relatively straight casing side walls 23 and 24 and the arcuately shaped casing top wall 25. The casing also includes, for compartments 17 thereof, a suitable bottom wall 26, on which falls, and from which is periodically removed, through a clean-out door 27 in the casing side wall 23, the dirt, cinders, heavier particles of lint and the like which are freed from the waste in the rotatable cylinder and which leave such cylinder through the slots 11 in the side wall thereof. The casing may also include, as it here does, a suitable cabinet for electric control parts, the control cabinet 28 here shown being suitably mounted upon the casing side wall 24.

Extending between the two upright end castings 18 and 19, and suitably journalled therein, are two horizontally disposed drive shafts 30, the V-grooved rollers 31 of which (two on each shaft) have supporting and driving engagement with the V-shaped peripheral portions 32 of the cylinder end rings 14 and 15. For rotating said drive shafts, and hence the waste-receiving cylinder, an electric motor 34 is here utilized, said motor being mounted on the cylinder enclosing casing at the outbound end thereof and being operatively connected to the drive shafts 30 through an endless belt 37, a speed reducing device 38, bevelled gears 39, 40, 41 and 42, an endless chain 43 and sprocket wheels 44 on such drive shafts. As viewed from the line 2—2 in Fig. 1, or in other words, as viewed in Fig. 2, the drive shafts 30 rotate in a clockwise direction, with the consequent rotation of the waste-receiving cylinder in a counter-clockwise direction, as indicated by the arrow in Fig. 2. As viewed from the line 4—4 in Fig. 1, or in other words, as viewed in Fig. 4, the direction of rotation of the waste-receiving cylinder is clockwise, as the arrow in Fig. 4 indicates. It is to be understood, however, that the direction of rotation of such cylinder does not actually change, if viewed from the same point. It is also to be understood that the speed of rotation of such cylinder may be varied and controlled, as desired.

For automatically effecting the travel through the cylinder of waste delivered thereinto at the inbound end thereof, and for assisting in the tumbling of such waste during its travel through said cylinder, a plurality of prong bar assemblies, associated with said cylinder and in circumferentially spaced relation, are here utilized, there being four such assemblies in the apparatus here illustrated. As the prong bar assemblies are of like construction and operate in the same manner, a description of one will suffice for all.

As best shown in Fig. 6, each of said prong bar assemblies includes a longitudinally slotted tube 48 which extends through the waste-receiving cylinder, just inside of its cylindrical side wall, and also through the end rings 14 and 15 of said cylinder, said cylinder end rings being provided with annular bearings 49 and 50 through which the end portions of said tube extend. Surrounding the "inbound" end portion of said tube 48 is a sleeve 52, the inner end portion of which is journalled in the annular bearing 49 in the inbound cylinder end ring 14, and mounted within such inbound tube end portion is a longitudinally slotted sleeve 54. Slidably mounted within such slotted sleeve 54 is a push and pull rod 56, and to prevent relative rotation of said slotted sleeve and rod and yet permit said rod to slide through or reciprocate in said sleeve, said rod is provided with a longitudinally disposed key 57 which extends at all times into the slot of said sleeve 54. Mounted on the outer end of the push and pull rod 56 is a flanged wheel or roller 58, which cooperates with two semi-circular cam bars 59 and 60 hereinafter referred to.

Surrounding the "outbound" end portion of the slotted tube 48 and journalled in the annular bearing 50 in the outbound cylinder end ring 15 is a sleeve 62, the enlarged and grooved outer end portion 63 of which is located outwardly beyond said bearing 50. Mounted within said outbound tube end portion is a longitudinally slotted sleeve 65, and by the use of a set screw 66 or the like, the tube 48 and the outer and inner sleeves 62 and 65 are connected for rotation as a unit. Slidably mounted within the inner, longitudinally slotted sleeve 65 is a supporting rod 67, and in order to prevent relative rotation of such sleeve and said rod and yet permit said rod to slide or reciprocate in said sleeve, said rod is provided with a longitudinally disposed key 68 which extends at all times into the slot of said sleeve 65, as clearly indicated in Fig. 6.

Arranged within the slotted tube 48 is a prong bar tube 70, the "inbound" end portion of which telescopes and is thereby supported on the reduced inner end portion 71 of the push and pull rod 56, and the "outbound" end portion of which prong bar tube telescopes and is thereby supported on the reduced inner end portion 72 of the supporting rod 67. In order to maintain the push and pull rod 56, the prong bar tube 70 and the supporting rod 67 in assembled relation, and for reciprocation as a unit within the slotted tube 48, the ends of said prong bar tube may be welded or otherwise suitably secured to the push and pull rod 56 and to the supporting rod 67, as will be readily understood. Suitably secured to the prong bar tube 70 and extending therefrom outwardly through the longitudinal slot in the tube 48 are a plurality of longitudinally spaced waste-engageable prong bars 74, which may be, and preferably are, slightly curved, as shown.

The two semi-circular cam bars 59 and 60, heretofore referred to and which cooperate with the flanged wheel or roller 58 of the push and pull rod 56 of each prong bar assembly, are carried by a pair of cross bars 75, which are bolted or otherwise rigidly secured to bosses or the like with which the inbound end casting 18 is provided. As clearly shown in Fig. 2, the semi-circular cam bars 59 and 60 are concentric with the longitudinal axis of the waste-receiving cylinder and are disposed on opposite sides of such axis. The cam bar 59 at the "rising" side of said cylinder is a pushing or advancing cam bar, the inclined disposition of said cam bar being such that as it "rises" it gradually approaches said cylinder. The cam bar 60, however, at the "falling" side of said cylinder is a pulling or retracting cam bar, the inclined disposition of said cam bar being such that as it "falls" it gradually recedes or moves away from said cylinder. As a result, the engagement of the advancing cam bar 59 with the outer surfaces of the rollers 58 of those prong bar assemblies which are at the rising side of the waste-receiving cylinder causes those particular rollers, and those prong bars 74 which reciprocate therewith, to advance or move toward the outbound end of said cylinder, with the consequent advance or forward travel of the waste carried by such prong bars. On the other hand, the engagement of the retracting cam bar 60 with the inner surfaces of the rollers 58 of those prong bar assemblies which are at the falling side of said cylinder cause those particular rollers, and those prong bars 74 which reciprocate therewith, to retract or move backwardly, with the consequent return of those prong bars to their "starting" positions, all as will be readily understood.

Another function of the prong bars of each prong bar assembly, when each such assembly is at the rising side of the waste-receiving cylinder, is to assist such rising cylinder side in elevating portions of the waste in said cylinder and in discharging such elevated waste onto the inclined slide sheet 76 of the hereinafter described waste shaking mechanism. For the efficient performance of that function, each of the present prong bar assemblies is provided at the inbound end of the apparatus with a radially disposed lever 78, the outer end of which carries a roller 79. As here shown, the lever 78 of each prong bar assembly has a tubular inner end portion 80 which is mounted upon, and secured by a set screw 81 to, the outer end portion of the sleeve 52 of such assembly.

In each prong bar assembly, as best shown in Fig. 6, the sleeves 52 and 54, the inbound end portion of the slotted tube 48, and the tubular inner end portion 80 of the lever 78 are connected by a suitable key 82, with the result that such parts rotate as a unit. As best shown in Fig. 3, each prong bar assembly is provided with suitable means, such as a coiled tension spring 83, for normally urging such assembly to rotate in the direction of cylinder rotation, the purpose of which will hereinafter appear. As here shown, the coiled tension spring 83 of each prong bar assembly has one of its ends partly wrapped around and suitably anchored to the enlarged and grooved end portion 63 of the sleeve 62 of such assembly, the outer end of said spring being suitably anchored to the outer face of the outbound cylinder end ring 15.

For cooperation with the lever rollers 79 of the four prong bar assemblies, two cam bars 84 and 85 are here provided on the outer face of the inbound end casting 18, said cam bars being, if desired and as here shown, integral parts of such casting. As best shown in Fig. 2, the cam bar 84 is of semi-circular form, and is located at the rising side of the waste-receiving cylinder in eccentric relationship with respect to the longitudinal axis thereof, the distance between such cam bar and such cylinder axis being a gradually decreasing one as said cam bar rises.

Just before each prong bar assembly reaches its lowermost position, during rotation of the waste-receiving cylinder, the lever roller 79 of such assembly engages the lower end portion of the eccentric cam bar 84, the engagement of said roller and said cam bar being maintained by the coiled tension spring 83 of such prong bar assembly. When such prong bar assembly reaches the position of the lowermost prong bar assembly shown in Fig. 2, its prong bars 74 will be substantially vertical. During continued rotation of the cylinder, with consequent rising movement of this particular prong bar assembly, the lever of such prong bar assembly will be depressed, or caused to trail, more and more because of the eccentricity of the cam bar 84, and as a result, the prong bars of this particular prong bar assembly, during this rising half of its circular path, will be maintained more or less horizontal, for effective waste elevation, the longitudinal curving of such prong bars facilitating, as will be readily understood, the elevation of said waste by such bars. When such prong bar assembly reaches its uppermost position, its lever roller 79 leaves the upper end of the cam bar 84, whereupon the coiled tension spring 83 of such assembly becomes effective to swing the rotatable parts of such assembly in a counter-clockwise direction, with the consequent dropping of the waste carried by the prong bars 74 of such assembly onto the inclined slide sheet 76 of the hereinafter described waste shaking mechanism.

In order to limit such counter-clockwise movement of the rotatable parts of each prong bar assembly, when its lever roller 79 leaves the upper end of the cam bar 84, suitable stops or abutments 87 are here provided on the outer face of the inbound cylinder end ring 14, there being one of such stops for, and in advance of, each of the prong bar assemblies. As the result, when the lever roller 79 of a prong bar assembly leaves the upper end of the eccentric cam bar 84, the coiled tension spring 83 of such assembly is effective to swing the rotatable parts of such assembly only about one-half of a revolution, or in other words, through approximately 180°, further counter-clockwise rotation of such rotatable assembly parts being arrested by the engagement of the lever 78 of such assembly with the stop 87 therefor, all as clearly indicated in Fig. 2. Such arresting of the counterclockwise rotation of each such prong bar assembly not only locates the lever roller 79 thereof in proper position for engagement with the reversing cam bar 85 hereinafter referred to but also locates the prong bars 74 of said assembly alongside and in more or less conformity with the contour of the cylinder side wall, and as a result, there is sufficient room for said prong bars to pass, during downward travel thereof, behind the upper edge of the inclined slide sheet 76 of the waste shaking mechanism.

As best shown in Fig. 2, the reversing cam bar 85 is a relatively short bar, and is located just slightly in advance of the lower end of the eccentric cam bar 84. When descending, each prong bar assembly has its roller-carrying lever 78 in advance of its prong bars 74, a relationship which is brought about by the effect of the coiled tension spring 83 of such assembly. The function of the reversing cam bar 85, therefore, is to reverse that relationship, namely, to position the prong bars 74 in advance of the roller-carrying lever 78 and during the engagement of the lever roller 79 of a descending prong bar assembly with the reversing cam bar 85, a progressively increasing retarding effect is exerted upon such roller and the lever 78 by which it is carried, and the result of that retardation is the advancement of the prong bars of such assembly relative to such lever and its roller. The use of the reversing cam bar 85, therefore, accomplishes the return of each descending prong bar assembly to proper position for the engagement of its lever roller 79 with the eccentric cam bar 84, all as will be readily understood.

The shaking mechanism of the present apparatus, by means of which the waste within the rotatable cylinder is repeatedly and more or less vigorously shaken during its travel through said cylinder, includes, in addition to the inclined slide sheet 76 heretofore referred to, a set of three longitudinally extending and generally horizontal supporting bars 90, 91 and 92. As best shown in Figs. 4 and 4a, these three bars lie beneath said slide sheet 76, the bar 91 being above the bar 90 and being slightly rearwardly disposed, in accordance with the inclination of said slide sheet, and the bar 92 being at the rear of the bar 91, in alignment therewith but spaced therefrom. At its two ends, this set of bars is provided, integrally as here shown or otherwise, with generally rectangular end pads 93, which are bolted or otherwise suitably secured to the casing end castings 18 and 19 and which pads form the end walls of an oil reservoir 94. Said reservoir is closed at its bottom and at its rear by a sheet metal closure member 95, which extends between the end pads 93 and which may be suitably secured to the supporting bars 90 and 92. At its top, said reservoir is provided with a removable closure member 96, and for the front of said reservoir, a removable closure member 97 is provided, said removable closure members 96 and 97 being of full reservoir length and the front closure member 97 being interposed between, and in engagement with, the slide sheet 76 and the supporting bars 90 and 91.

For the shaking of the waste, a plurality of shaker fingers 99 are here provided, said fingers being longitudinally spaced throughout substantially the entire length of the waste-receiving cylinder. These fingers may be, and here are, formed from round bar stock and, as Figs. 4 and 4a will disclose, are designed to simulate the human arm, with the elbow slightly bent, with the palm of the hand uppermost and with the fingers slightly curved upwardly. The upper portion 100 of each of the present shaker fingers, which portion corresponds to that part of the human arm between the elbow and the shoulder, extends through suitable bearings in the supporting bars 90 and 91 and is provided above the bar 91, and within the oil reservoir 94, with a spur gear 101. For the driving of these spur gears, a gear rack 102 is provided, reciprocation of which is effected by an electric motor 103 operatively connected with such gear rack (see Figs. 2 and 5) through a connecting rod 104, a crank shaft 105 and suitable speed reducing gearing. By reciprocatory movement of said gear rack, the shaker fingers 99 are caused to oscillate, the upturned free ends of such fingers describing arcs of approximately 180° and the plane of oscillation of those parts of such fingers which correspond to human forearms being somewhat upwardly inclined. As will be readily understood, the speed of oscillation of the shaker fingers depends upon and is controlled by the speed of reciprocation of the gear rack 102, and such speed may be readily varied, of course, as the nature and the condition of the waste requires. For the lubrication of the gear rack 102, the spur gears 101 and the shaker finger bearings in the bars 90 and 91, a small plunger type pump 107 is here provided, said pump being mounted within the oil reservoir 94 between the supporting bars 91 and 92 and beneath the gear rack 102. The operation of said pump is effected by a cam 108 attached to the lower side of said gear rack, and by the use of a pipe 109, the pump is enabled to distribute to the parts to be lubricated a constant supply of oil during operation of the present apparatus.

During the travel of the waste through the rotatable cylinder of the present apparatus, said waste is subjected to currents of heated air, which not only dry the waste by the removal of its moisture but which also aid in the loosening up of the waste, in the expanding of its fibres and in the removal of its lint content. As here shown, twin blowers 112 of conventional form are mounted upon the casing of the present apparatus and are driven by an electric motor 113 arranged therebetween. The intake opening of each of the blowers has associated therewith an air supply duct 114, and associated with each of such ducts is a hood 115, one of said hoods being in air receiving communication with the inbound end of the waste-receiving cylinder and the other of said hoods being in air receiving communication with the outbound end of said cylinder. Inasmuch as it is neither necessary nor desirable to have the ends of such waste-receiving cylinder fully open, a condition which would make it more difficult to insure the flow into the hoods 115, rather than out into the room in which the present apparatus is located, of moisture and lint laden air which leaves said cylinder through the ends thereof, the end openings in the present cylinder are restricted, by the use of suitable end sheets 116, to such size as is necessarry for the delivery and removal of the waste. For the support of such cylinder end sheets, cross bars of the cylinder enclosing casing are here utilized, such as the cross bars 75 at the inbound end of said casing and a cross bar 117 at the outbound end thereof. To aid the hoods 115 to trap the air leaving the waste-receiving cylinder through the end openings thereof, flexible curtains 118 of fabric or the like may be mounted over each end of the present apparatus, as indicated in Fig. 5, and to remove from such air its moisture, lint, dust, etc., filter bags 119 or the like may be arranged within such hoods and their associated ducts 114, as clearly shown in Fig. 1 and as will be readily understood.

The air discharge openings of the blowers 112 communicate with an elongated housing 120 which in turn communicates with a suitable heater 121, and in passing through this heater, the air is heated, by steam pipes as here shown or otherwise, to any desired degree. Connected to the heater 121 is a duct 122, by means of which the heated air is discharged into the waste-receiving cylinder at the rising side thereof, and by making the duct 122 of nozzle shape, as here shown, the velocity of the air entering the cylinder is increased, with a consequent increase in the waste-penetrating value of such air.

Inasmuch as it is necessary, from a practical standpoint, to have at least partially open the ends of the casing of the present apparatus, for the delivery of waste thereto and for the removal of waste therefrom, and inasmuch as it is impractical to try to trap, for recirculation, all air leaving said casing through its end openings, it is desirable to more or less balance the air pressures inside and outside the apparatus, and thereby minimize at least the amount of moisture and lint laden air which passes from such apparatus out into the room wherein it is located. For this purpose, the housing 120 which communicates with the discharge openings of the blowers 112 may have arranged therein a pair of baffles 124 provided with adjustable air deflectors 125, one such baffle and its air deflectors being shown in Fig. 1. By adjustment of the air deflectors of these baffles, control is had of the amount of air which is by-passed to an exhaust conduit 126 with which the housing 120 also communicates, a conduit which leads outside the room in which the present apparatus is located.

For automatically removing from the present apparatus, through the outbound end thereof, waste which has been cleaned and renovated, a belt type unloading conveyor 127 is here utilized and as said conveyor is of more or less conventional form, only a brief description thereof is here necessary. As indicated in Fig. 5, the receiving end of such unloading conveyor is located within the outbound end of the rotatable waste-receiving cylinder, and the waste-advancing action of such cylinder and its prong bar assemblies is sufficient to automatically effect the deposit of clean and renovated waste onto the belt of such conveyor. Unlike the belts of conventional conveyors, the belt 128 of the present conveyor is provided throughout substantially its entire waste-receiving surface with suitable teeth 129, the effect of which is to provide such belt with the necessary traction and to insure the unloading of all waste, including those portions momentarily engaged by prong bars and/or shaker fingers. By the use of the present unloading conveyor, the cleaned and renovated waste is automatically removed from the waste-receiving cylinder and carried upwardly and outwardly therefrom by such conveyor, and automatically dumped thereby into drums or other suitable containers, as will be readily understood. For the driving of the belt 128 of such conveyor, the electric motor 34 (which rotates the cylinder drive shafts 30) is here utilized, said motor being operatively connected (see Fig. 3) with the driving pulley of such conveyor belt through the reducing device 38, a sprocket chain 130, etc.

Although not essential, a waste loading conveyor is preferably used with the present apparatus, as such a conveyor enables the rate at which the waste is fed into the rotatable cylinder to be conveniently controlled. For the apparatus here illustrated, a belt-type loading conveyor 131, shown in Figs. 1, 1a and 5, is utilized. As indicated in Fig. 5, a suitable baffle plate 132 is arranged between the belt reaches 133 and 134, the purpose of which is to prevent waste particles and the like from falling onto the upper or inner face of the lower belt reach 134 and being carried thereby to the belt pulleys. Inasmuch as the loading conveyor here shown does not otherwise differ from conventional belt conveyors, no further description of the present loading conveyor need be given, although mention might be made of the fact that the driving belt pulley of such conveyor is driven by the electric motor 103 through the crank shaft 105, bevel gears 135 and 136, sprocket chain 137, etc.

As will be readily understood from the foregoing description of the apparatus here illustrated, in the practice or employment of methods here involved, waste to be cleaned and renovated is deposited, by hand or otherwise, on the inwardly moving belt reach 133 of the waste feeding or loading conveyor 131, the waste feeding speed of said conveyor belt being regulated and controlled, as desired. On such conveyor belt, the waste is carried to the inbound end of the present apparatus and directly discharged by such belt into the inbound end of the rotating cylinder, within which the cleaning and renovating work is performed.

As each "mass" of waste falls into said rotating cylinder, it is carried upwardly and forwardly by the advancing prong bars 74 at the rising side of the cylinder, and when such waste reaches the top of said cylinder, it is dropped by said prong bars onto the inclined slide sheet 76 and deposited thereby upon the oscillating shaker fingers 99. The vigorous shaking action to which the mass of waste is subjected by such shaker fingers accomplishes two important results. One is the loosening or breaking up of the mass of waste, which is in a more or less matted and compacted condition as the result of its journal box use, and the other is the removal from such mass of waste of dirt, cinders, lint and the like, the refuse or foreign matter thus removed falling by gravity through the slots 11 in the cylinder side wall into the casing compartment 17 therebelow. From the shaker fingers 99, the mass of waste (which is now in at least a partially clean and broken up condition) falls onto the cylinder side wall, and is again carried upwardly and forwardly by the advancing prong bars and is again subjected to a shaking action by the oscillating shaker fingers 99, and this procedure continues until such mass of waste reaches the outbound end of said cylinder.

As a result, when the mass of waste reaches such outbound end of said rotating cylinder, it is substantially free of dirt, cinders, lint and the like, and is in a thoroughly loosened and broken up condition, with its inherent resiliency and its ability to absorb and retain moisture fully restored. Moreover, during its travel through said cylinder, the mass of waste is constantly subjected to heated air currents, the velocity of which is sufficient to enable them to penetrate the waste and not only remove the moisture therefrom but also, assist in the agitation of the waste and the removal therefrom of dirt, cinders, lint, etc. The moisture and the finer particles of lint removed from the waste leave the rotating cylinder with the outgoing air, and before such air is again circulated through said cylinder, it is passed through suitable filtering means for the removal therefrom of its entrained moisture, lint, dust and the like.

Upon reaching the outbound end of the rotating cylinder, each mass of waste is deposited, by the advancing movement of those "cylinder rising side" prong bars at the outbound end of said cylinder, onto the outwardly moving belt 128 of the unloading conveyor 127, and such belt carries the now clean, dry and renovated waste to, and deposits it in, suitable drums or containers, ready for journal box use when supplied with oil. In the cleaning and renovating of old journal box waste, by the use of the present apparatus, it is desirable, of course, that such waste be freed, so far as is practical, of its oil content, one satisfactory manner of removing such oil being by centrifugal extraction, as is well known in the art to which this invention relates.

As will be readily understood, the output of the present apparatus and its efficiency depend, at least in part, upon the conveyor speeds, the material-advancing rate of the prong bars, the speed of oscillation of the shaker fingers, and the drying value of the heated air currents, and in the determination of those factors, the nature and the condition of the material to be cleaned, dried, renovated or otherwise acted upon are, of course, of the utmost importance.

Numerous combinations and ratios are possible with the present apparatus, and in the cleaning and renovating of certain material, it is satisfactory to have the material-advancing rate of the prong bars ten per cent higher and the outbound conveyor speed twenty per cent higher than the inbound conveyor speed, the effect of these progressively increasing speeds being to prevent the material from "clogging" the apparatus. If the material to be treated has a marked tendency to tangle and form a compact mass, and thereby more or less resist the advancing action of the prong bars and at least partially nullify the benefits of the shaking action by the oscillating shaker fingers, the material-advancing rate of the prong bars may be increased to approximately one hundred and twenty per cent of the inbound conveyor speed and the outbound conveyor speed may be increased to approximately one hundred and thirty per cent of such inbound conveyor speed, as will be readily understood.

For increased output, the speed of operation of these parts may be increased, in the proportions or ratios herein referred to or otherwise, and within certain limits, the speed of oscillation of the shaker fingers may remain constant without sacrifice in the amount of "work" performed thereby. This is due to the fact that in the ordinary operation of the apparatus, the material is engaged by the shaker fingers for only a part of the time required for the rotating cylinder to make one-quarter of a revolution, there being, as heretofore pointed out, four sets of prong bars in the apparatus here illustrated. It is also to be noted that variations in the material-advancing rate of the prong bars and in the speeds of the inbound and outbound conveyors does not affect the number of times that the material is deposited on the shaker fingers during its travel through the rotating cylinder, as that number depends only on the length of such cylinder and the extent of prong bar advance during forward reciprocation thereof.

In order to enable the material to be properly dried by the heated air currents introduced into the rotating cylinder, regardless of the rate of travel of such material through said cylinder, the capacity of the blowers 112 and the heater 121 are sufficiently great to enable such air currents to have drying or evaporating values as high as desired, the heating value of the steam delivered to the heater 121 here shown being varied, as desired.

As heretofore pointed out, the most satisfactory journal box waste is a mixture of old and new waste, one very satisfactory mixture being composed of approximately seventy-five per cent old waste and approximately twenty-five per cent new waste. Before new waste is used, however, the lint therein should be removed, and if the mixture is to be a satisfactory one, the old and new waste fibres must be intimately and thoroughly mixed or intermingled.

By the use of the present methods, old and new waste can be easily and quickly mixed, intimately and thoroughly and in any desired proportions, as the tumbling and shaking to which the waste is subjected during its travel through the rotating cylinder of the present apparatus effects a breaking up of the waste and a thorough mixing and intermingling of the fibres thereof. Moreover, the lint in the new waste is effectively removed therefrom during the mixing of such waste with the old waste, and the old waste is, of course, thoroughly cleaned and renovated while it is being mixed with the new waste, all as will be readily understood.

In the appended claims, the term "waste" is to be considered as including not only journal box waste but also, other fibrous materials and materials of a kindred nature, such as granular materials and the like which now are, or which may be, subjected to cleaning, drying, screening and like treatment. Furthermore, the term "cleaning" (and like terms) is to be considered as including moisture removal or drying, as well as cleaning by the removal of dirt, cinders, lint, etc. The term "renovating," as used in the appended claims, denotes a breaking or loosening up of the material, which in the case of journal box waste and the like, effects a restoration to the waste fibres of their inherent resiliency and their ability to absorb and retain oil, as heretofore pointed out.

Further features and advantages of the present invention will occur to those skilled in the art to which it relates.

What I claim is:

1. The method of cleaning and renovating waste during its travel through a passageway having a waste inlet and a waste outlet, which comprises elevating the waste in said passageway and simultaneously advancing it toward said outlet, dropping the waste from its advanced and elevated position, shaking the dropped waste by alternately moving it toward and from said outlet, and repeating such operations until the waste is advanced by successive advancements a predetermined distance in said passageway with respect to the outlet thereof.

2. The method of cleaning and renovating waste during its travel through a passageway having a waste inlet and a waste outlet, which comprises elevating the waste in said passageway and simultaneously advancing it toward said outlet, dropping the waste from its advanced and elevated position, shaking the dropped waste by alternately moving it toward and from said outlet, and repeating such operations until the waste is advanced by successive advancements a predetermined distance in said passageway with respect to the outlet thereof, the advancements of the waste while elevated being uniform throughout the travel of the waste through said passageway.

3. The method of cleaning and renovating waste during its travel through a passageway having a waste inlet and a waste outlet, which comprises elevating the waste in said passageway and simultaneously advancing it a predetermined distance toward said outlet, dropping the waste from its advanced and elevated position, shaking the dropped waste by alternately moving it predetermined distances in opposite directions longitudinally of the passageway, and repeating such operations until the waste is advanced by successive advancements a predetermined distance in said passageway with respect to the outlet thereof.

4. The method of cleaning and renovating waste during its travel through a passageway having a waste inlet and a waste outlet, which comprises elevating the waste in said passageway and advancing it, while elevated, toward said outlet, dropping the waste from its advanced and elevated position, shaking the dropped waste by oscillating it longitudinally of the passageway, and repeating such operations until the waste is advanced by successive advancements a predetermined distance in said passageway with respect to the outlet thereof.

5. The method of cleaning and renovating waste during its travel through a passageway having a waste inlet and a waste outlet, which comprises elevating the waste in said passageway and advancing it, while elevated, toward said outlet, dropping the waste from its advanced and elevated position, shaking the dropped waste by moving it in opposite directions longitudinally of the passageway, repeating such operations until the waste is advanced by successive advancements a predetermined distance in said passageway with respect to the outlet thereof, subjecting the waste during each shaking operation to recirculating currents of heated air which dry the waste, and simultaneously discharging from said passageway some of such air and replacing it by a like quantity of fresh air.

6. The method of mixing and cleaning new and old journal box waste and of renovating the old waste during travel of the combined waste through an elongated chamber having a waste inlet and a waste outlet, which comprises depositing in said chamber adjacent the inlet thereof the new and old waste in the desired proportions, elevating the combined waste in said chamber and advancing it, while elevated, toward the chamber outlet, dropping the combined waste from its advanced and elevated position, shaking the combined waste upon the dropping thereof by movement of it back and forth longitudinally of the chamber, and repeating such operations until the now thoroughly mixed, cleaned and renovated new and old waste is advanced in said chamber by successive advancements a predetermined distance with respect to the chamber outlet.

THOMAS R. BOOTH.